(12) United States Patent
Benes et al.

(10) Patent No.: US 7,484,350 B2
(45) Date of Patent: Feb. 3, 2009

(54) REVERSABLE COUNTER KNIFE BANK

(75) Inventors: Jason M. Benes, Mount Joy, PA (US); James J. Bonatsos, Brownstown, PA (US); Nathan E. Isaac, Leola, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/810,213

(22) Filed: Jun. 5, 2007

(65) Prior Publication Data

US 2008/0305842 A1 Dec. 11, 2008

(51) Int. Cl.
*A01D 34/42* (2006.01)
(52) U.S. Cl. ...................................................... 56/504
(58) Field of Classification Search .................... 56/504, 56/294, 341; 460/112, 111, 901; 241/243, 241/32, 166, 292
See application file for complete search history.

(56) References Cited

U.S. PATENT DOCUMENTS

| | | | | |
|---|---|---|---|---|
| 2,842,175 A * | 7/1958 | Thompson | ................... | 241/243 |
| 3,874,604 A * | 4/1975 | Gronberg et al. | ............. | 241/243 |
| 4,077,573 A * | 3/1978 | Kersey et al. | .................. | 241/32 |
| 4,612,941 A | 9/1986 | Kunde | ....................... | 130/27 R |
| 4,637,406 A | 1/1987 | Guinn et al. | .............. | 130/27 R |
| 4,732,332 A | 3/1988 | Schitemaker | ................. | 241/32 |
| 5,482,508 A * | 1/1996 | Redekop et al. | .............. | 460/112 |
| 5,503,339 A * | 4/1996 | Doppstadt | ................... | 241/166 |
| 5,542,883 A | 8/1996 | Cruson | ......................... | 460/112 |
| 5,833,533 A | 11/1998 | Roberg | ......................... | 460/112 |
| 5,974,776 A | 11/1999 | Prellwitz | ....................... | 56/504 |
| 6,120,373 A * | 9/2000 | Schrattenecker | ............. | 460/112 |
| 6,152,820 A | 11/2000 | Heidjann et al. | ............. | 460/112 |
| 6,594,983 B1 | 7/2003 | Krone et al. | ................... | 56/341 |
| 6,595,123 B2 * | 7/2003 | Schrag et al. | .................. | 100/97 |
| 6,616,528 B2 * | 9/2003 | Wolters et al. | ............... | 460/111 |
| 6,769,239 B1 * | 8/2004 | Webb | ........................... | 56/341 |
| 2007/0004479 A1 | 1/2007 | Dow et al. | ................... | 460/112 |

FOREIGN PATENT DOCUMENTS

DE 19646316 5/1998
EP 0916252 5/1999

* cited by examiner

*Primary Examiner*—Árpád Fábián-Kovács
(74) *Attorney, Agent, or Firm*—Michael C. Harms; John William Stader; Patrick M. Sheldrake (57) ABSTRACT

A counter knife bank or knife rank for use with a stationary knife assembly, such as by attachment to a knife mounting assembly of the stationary knife assembly, of a chopper assembly of an agricultural combine, including a plurality of individual double-sided knife blades or elements joined together, such as by a spline connector that extends through aligned openings in the base body portions of the knife blades or elements, in an aligned columnar arrangement to form a knife formation that is connected to a support member, such as to an underlying member having an inverted U-shape, that is removably connectable to a depending side wall of the knife mounting assembly to permit initial use of the first cutting edges of the knife blades or elements, easy reversal of the counter knife bank or rank at a later time, and subsequent use of the second cutting edges of the knife blades or elements.

27 Claims, 9 Drawing Sheets

Fig. 10

REVERSABLE COUNTER KNIFE BANK

TECHNICAL FIELD

This invention relates generally to agricultural harvesting machines and to straw and residue choppers therewith, and more particularly to the stationary knife assemblies of residue choppers, particularly to a counter knife bank or knife rank of a stationary knife assembly, which counter knife bank or knife rank includes a plurality of knife blades or elements that have two cutting edges and which counter knife bank or knife rank can be removed from the stationary knife assembly and reversibly reinstalled in the stationary knife assembly to permit subsequent use of the second cutting edges of the knife blades or elements.

BACKGROUND ART

Straw and residue choppers have long been in use in or with agricultural combines for chopping into finer pieces for subsequent distribution over a field the crop residue, also referred to as material other than grain (MOG), resulting from a harvesting operation. Such choppers typically include a rotary element disposed laterally within a housing extending generally horizontally across the flow path of the crop residue through the housing, which rotary element has associated therewith about its periphery a number of knife blades or paddles, and a stationary knife assembly having a plurality of spaced blade elements therealong, which stationary knife assembly is positioned generally parallel to and spaced from the rotary element such that the knife blades or paddles of the rotary element cooperate with the blade elements of the stationary knife assembly to chop the crop residue as it passes between the rotary element and the stationary knife assembly.

Typically, the rotary element includes a cylindrical tube or like member having a plurality of mounting locations distributed about its periphery, at which locations various knife blades or paddles may be mounted or affixed.

Often, the stationary knife assembly may have associated therewith an adjustment mechanism that is operable to vary the spacing between the rotary element and the stationary knife assembly, as may be desirable depending upon the crop being harvested.

Generally, the stationary knife assembly includes a longitudinal knife mounting assembly that extends across the crop residue flow path and a plurality of individual knife blades or elements spaced from one another along the length of such knife mounting assembly and individually attached or affixed to or mounted on or to such knife mounting assembly.

As noted, such residue choppers have long been in use in or with agricultural combines. In the operation of a typical combine that employs a threshing rotor, the flow of crop residue or MOG remaining after threshing is typically discharged into a crop residue distribution system located below and rearwardly of the rear end of the threshing system, which crop residue distribution system typically includes a primary rotary chopper or beater apparatus that chops or beats the residue into smaller pieces and propels the resultant crop residue further rearwardly within a rear end of the combine for either discharge from the combine through a rear opening onto a field, or into another secondary chopper and/or spreader mounted on the rear end operable for spreading the residue over a swath of a field.

During a typical operation of the combine, as the crop residue is discharged from the combine rotor and moves through the crop residue distribution system it flows between the rotary element of the primary chopper and the stationary knife assembly thereof and is chopped into smaller pieces by the cooperative action of the knife blades or elements of the stationary knife assembly and the knife blades or paddles on the rotating rotary element. The rotational movement of the rotary element not only effects a cutting of the material encountered by the knife blades or paddles associated therewith but also serves to propel the resultant flow of crop residue further rearwardly.

Current combine harvester owners have high expectations of maximal throughput of crop residue through the crop residue distribution system, as well as expectations that the crop residue distribution system, including the chopper thereof, will be both easy to use and easily and readily adjustable. Unfortunately, large throughput results in substantial wear on major components of the crop residue distribution system, with the various components of the chopper being some of the most affected parts. Despite a recognition by users of the inevitability of such wear, users nevertheless desire that, and actively seek ways that, the life span of components such as knife blades and elements can be made to extend through an entire year of harvesting activities, or longer. However, since the knife blades and elements of both the rotary element and the stationary knife assemblies are subjected to continuing, heavy wear and abuse as the crop residue flow moves through the primary chopper, the leading edges of the individual knife blades and elements typically become unacceptably dull and/or damaged in a shorter time, often in less than a year. To address this problem, many in the industry have turned to the use of knife blades and elements that have two cutting edges and which are reversible at approximately mid-season to thereafter permit use of the second cutting edge for the remainder of the season. With such constructions, the desired year's worth of harvesting activities can often be realized with a single set of knife blades and elements.

While the need for the purchase of new components during the harvesting season can thus be reduced to some degree by the use of double-sided knife blades and elements, and while such double-sided knife blades and elements can often be effectively employed for an entire year of harvesting activities by removing and reversibly reinstalling the knife blades and elements mid-season to permit use of the second cutting surface during the latter portion of the year, such mid-season reversal of the plurality of individual knife blades and elements has not been an easy task. In such regard, while the efficacy of mid-season reversal of such plurality of individual knife blades and elements has been recognized, users have often found such reversals to be both time consuming and problematic, especially due to safety issues occasioned by the process of reversing each knife blade or element on an individual basis, particularly since each reversal operation introduces a risk that the user may suffer an injury, such as a cut to a hand or arm. Consequently, some users have decided to avoid the hassle and safety threats associated with making such reversals and to delay as long as possible, and even to forego, such reversals. Such delay and/or forbearance, while understandable, typically results in reduction of performance of the chopper and consequent lessened user satisfaction with system operation.

Thus, what has continued to be sought is an apparatus and method of use thereof for facilitating and simplifying the reversal of the double-sided knife blades or elements in a chopper assembly, especially so that the time required for making such reversals is reduced while safety is improved.

The present invention, as discussed and described hereinafter, addresses such an apparatus and its use.

SUMMARY OF THE INVENTION

What is disclosed is a counter knife bank or knife rank that allows for easy reversal of the double-sided knife blades or elements of the stationary knife assembly of a chopper construction, and a method of use thereof, that achieves the advantages sought therefor while overcoming various problems associated with the use of double-sided knife blades and elements in previous chopper assembly constructions.

Such counter knife bank or knife rank and method are especially useful with chopper assemblies for agricultural combines and like equipment, including combines which include an axially arranged threshing system having at least one rotor rotatable within a concave for moving crop residue along an internal rotor residue passage and discharging a flow of crop residue into and through a rearwardly located, generally downwardly facing discharge passage to a crop residue distribution system that includes the chopper assembly, but are not limited to use in such systems or applications. The chopper assembly typically includes a housing and a rotary element disposed laterally within the housing extending generally horizontally across the flow path of the crop residue through the housing, which rotary element has associated therewith about its periphery a number of knife blades or paddles, and a stationary knife assembly having a plurality of spaced blade elements therealong, which stationary knife assembly is positioned generally parallel to and spaced from the rotary element such that the knife blades or paddles of the rotary element cooperate with the blade elements of the stationary knife assembly to chop the crop residue as it passes between the rotary element and the stationary knife assembly. Typically, the rotary element includes a cylindrical tube or like member having a plurality of mounting locations distributed about its periphery, at which locations various knife blades or elements may be mounted or affixed, and the stationary knife assembly may have associated therewith an adjustment mechanism that is operable to vary the spacing between the rotary element and the stationary knife assembly, as may be desirable depending upon the crop being harvested.

In prior art constructions, the stationary knife assembly has typically included a longitudinal knife mounting assembly that extends across the housing, generally parallel to the rotary element, and a plurality of knife blades or elements distributed along the length of the knife mounting assembly. Such knife blades or elements have typically been double-sided knife blades or elements with a base body portion and an upwardly projecting portion that terminates at its upper end in a central point with oppositely disposed lateral cutting surfaces depending outwardly from the such point, generally in like, tapered manners, to the base body portion.

One typical stationary knife assembly that has been widely employed has employed a knife mounting assembly that has a longitudinal, generally flat, upper plate, end plates at the opposite ends of the upper plate, and depending side wall portions along the length of the upper plate generally at or near the sides of the upper plate and extending between the end plates. The upper plate has included spaced slots extending laterally across the upper plate between the sides thereof and along the length of the plate, through which slots upper portions of installed knife blades or elements may project when the knife blades or elements are positioned beneath the upper plate and the upper portions are inserted through the slots in the upper plate. The end plates have typically been attachable to the concave pan assembly in some fashion so as to maintain the knife mounting assembly in a position extending generally horizontal across the flow path of the crop residue through the chopper assembly.

With some of such constructions, the end plates have included aligned sidewardly extending ear projections that have been associated with and have extended sidewardly beyond one of the side wall portions of the knife mounting assembly and have included connection openings therethrough for connecting the ear portions to the side members of the concave pan assembly. When such end plates have been so connected to the side members of the concave pan assembly, the connection points have defined an axis of rotation for the knife mounting assembly, which axis of rotation has extended generally horizontally between the outer side members of the concave pan assembly, generally parallel to the rotary member. The knife mounting assembly has been rotatable about such axis to vary the spacing between the rotary element and the portions of the knife blades or elements projecting from the spaced slots of the knife mounting assembly. One or both of the end plates have further typically included a depending portion connected to a positioning rod or other control member or assembly to control the rotation of the knife mounting assembly about the noted axis of rotation and the extent to which the knife blades or elements of the stationary knife assembly project into the flow passage adjacent to the rotary member.

Typical of the knife blades or elements utilized with such a knife mounting assembly have been blade constructions that have included an upper portion that has the general shape of an isosceles triangle, the two like sides of which triangular portion have been sharpened to form cutting edges and extend to an upper point or apex area and the base side of which triangular portion forms the top of a generally rectangular base body portion that includes an opening therethrough, generally of a rectangular shape, cross-wise to the blade.

In such constructions, such knife blades or elements have been individually positionable such that the upper points and cutting edges of the two like sides of the isosceles triangle portions of the knife blades or elements have projected through slots in the upper plate of the knife mounting assembly while the base body portions of such knife blades or elements have remained positioned below the upper plate of the knife mounting assembly. Such knife blades or elements have been held in place by one or more longitudinally extending mounting members that have included spaced tab or hook-like projections thereon to complementarily engage the openings in the base body portions of the knife blades or elements, with such mounting members being positioned beneath the upper plate of the knife mounting assembly and between the side walls thereof and also being connected to a side wall of the knife mounting assembly to hold such mounting members and the complementarily engaged knife blades or elements in place with respect to the knife mounting assembly.

Reversal of the knife blades or elements of such constructions could, with effort and time, be accomplished by disconnecting the mounting members from the side wall of the knife mounting assembly, then disengaging the mounting members from the individual knife blades or elements, thereafter individually reversing each of the knife blades or elements, then re-engaging the mounting members with the individual, reversed knife blades or elements, and subsequently re-connecting the mounting members to the side wall of the knife mounting assembly. Such an operation has been both problemsome and time consuming.

By employing the present invention, the process of reversing the double-sided knife blades or elements is significantly improved and the time required for such reversal is greatly shortened. With a preferred form of the present invention, like knife blades or elements and many like components of the knife mounting assemblies such as have been discussed hereinabove can continue to be readily employed, but such knife blades or elements are assembled to form one or more counter knife banks or knife ranks each of which can, as a unit, be easily reversibly utilized with the knife mounting assembly. Thus, instead of requiring that the plurality of knife blades or elements in the stationary knife assembly each be individually reversed, the present invention requires only that the limited number of counter knife banks or knife ranks be reversed as a unit.

With such preferred form of the invention, a counter knife bank or knife rank is provided which includes a plurality of individual double-sided knife blades or elements, such as the double-sided knife blades or elements described hereinabove, and a longitudinal spacing connector assembly joining and spacing the plurality of knife blades or elements from one another in a rank arrangement. In such rank arrangement, the plurality of knife blades or elements are joined together in an aligned column, such as by a spline connector that extends through aligned openings in the base body portions of the knife blades or elements, and such rank arrangement is connected to a support member, such as to an underlying member having an inverted U-shape, that is connectable to a depending side wall of the knife mounting assembly.

In alternative embodiments, the counter knife bank or knife rank may, for example, include a plurality of separate knife blades or elements, such as U-shaped knife elements whose legs are double-sided blades, each of which separate knife blades or elements is more directly attachable to a support member, such as an underlying member having an inverted U-shape, that is connectable to a depending side wall of the knife mounting assembly.

Reversal of such counter knife bank or knife rank can be readily and quickly accomplished by disconnecting the support member from the side walls of the knife mounting assembly, reversing the counter knife bank or knife rank, and reconnecting the support member of the reversed counter knife bank or knife rank to one or both of the side walls of the knife mounting assembly. Such operation can be accomplished more expeditiously and more safely than the individual reversal of the plurality of knife blades or elements.

DETAILED DESCRIPTION OF THE INVENTION

Figure 1:
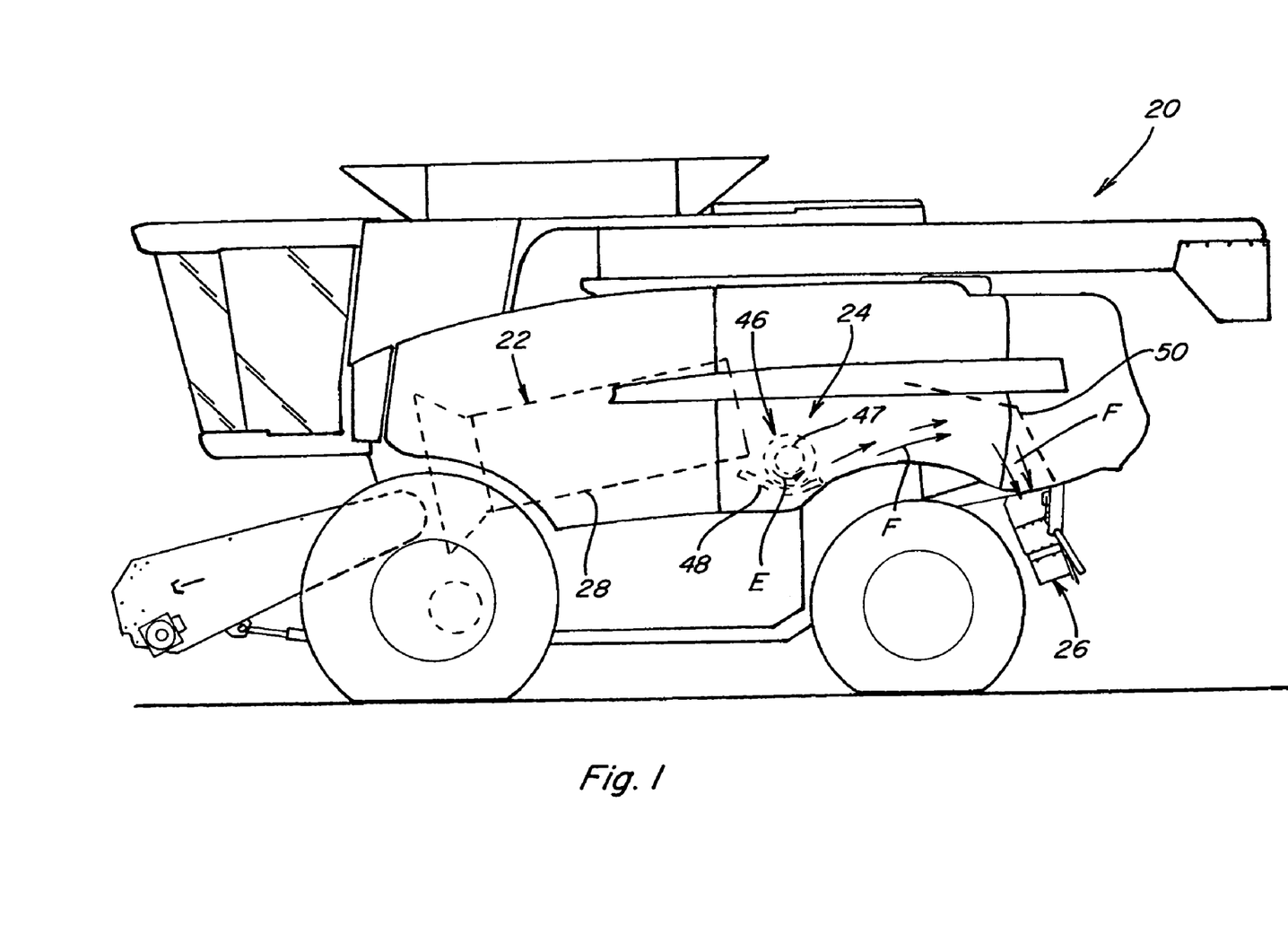
FIG. 1 is simplified side plan view, from the left side, of an agricultural combine, illustrating, in dotted outline, an axially arranged threshing system of the combine and a chopper assembly of the residue distribution system of the combine.
Figure 2:
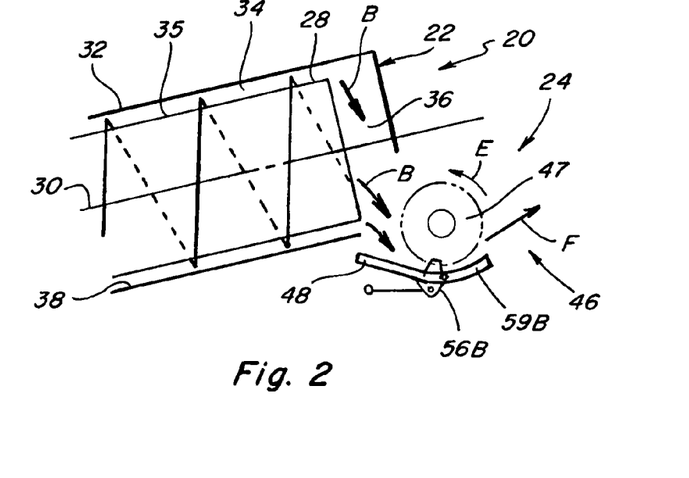
FIG. 2 is a simplified side plan view, from the left side, of the threshing system and crop residue distribution system of the combine of FIG. 1.

Referring now to the drawings, wherein preferred embodiments of the present invention are shown, wherein like numerals refer to like items, and wherein certain elements and features may be labeled or marked on a representative basis without each like element or feature necessarily being individually labeled or marked, FIGS. 1 and 2 depict a representative agricultural combine 20 that includes an axially arranged threshing system 22, a crop residue distribution system 24, and a crop residue spreader 26, all of well known construction and operation.

As can be generally and essentially observed from a review and study of FIGS. 1-2, threshing system 22 is axially arranged in that it includes a cylindrical rotor 28 conventionally supported and rotatable in a predetermined, typically clockwise direction, about a rotational axis 30 therethrough and within a concave 32, for conveying a flow of crop material in a helical flow path through a space 34 extending circumferentially around an outer cylindrical surface 35 of rotor 28 and an inner circumferential surface 38 of concave 32. As the crop material is moved through space 34, the crop, such as grain, legumes, or the like, will be loosened and separated from crop residue such as husk and pods, and carried away therefrom in the well known conventional manner.

As may be best illustrated by FIG. 2, the crop residue will continue along a helical path through space 34, and will be expelled therefrom, as denoted by arrows B, into and through a discharge opening and passage 36, which essentially comprises an extension of space 34 at the downstream end of rotor 28. The consistency of the flow of crop residue, volume thereof, and extent or pattern thereof, will typically vary, and be a function of a variety of conditions, including, but not limited to, a speed of rotation of rotor 28, crop type, plant maturity, moisture content, and weather conditions. As an example, rotor speeds can vary between just a few hundred rpm and over a thousand rpm. Wheat and other small grains will typically have relatively small crop residue components, whereas other grains, such as corn, will typically have larger components, such as thick stalk segments, cob fragments, and large leaves.

Here, it should be noted that crop residue distribution system 24 will typically include a rotary device, such as a chopper 46, having a rotary element 47 rotatable in a direction E above a concave pan assembly 48. Rotary element 47 typically rotates at a rapid speed, so as to be capable of accelerating and propelling a flow of crop residue rearwardly within the confines of the rear end of combine 20, as generally denoted by arrows F. Such rearward flow is typically guided and directed by internal panels or shields, generally denoted by shields 50 (FIG. 1), so as to either flow into a secondary crop residue chopper and/or spreader, such as chopper/spreader 26, or through a rear opening so as to be deposited directly onto a field.

Figure 3:
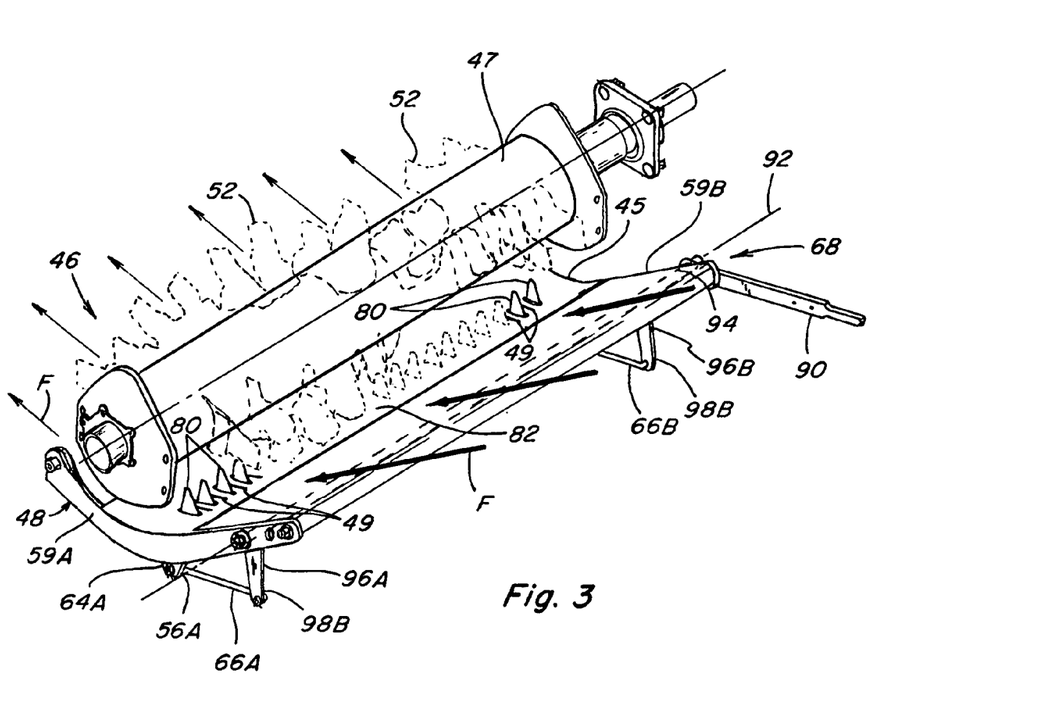
FIG. 3 is a perspective view of a portion of a chopper assembly generally looking rearwardly from the right front thereof, illustrating a positioning of the knife mounting assembly in a non-rotated position.
Figure 4:
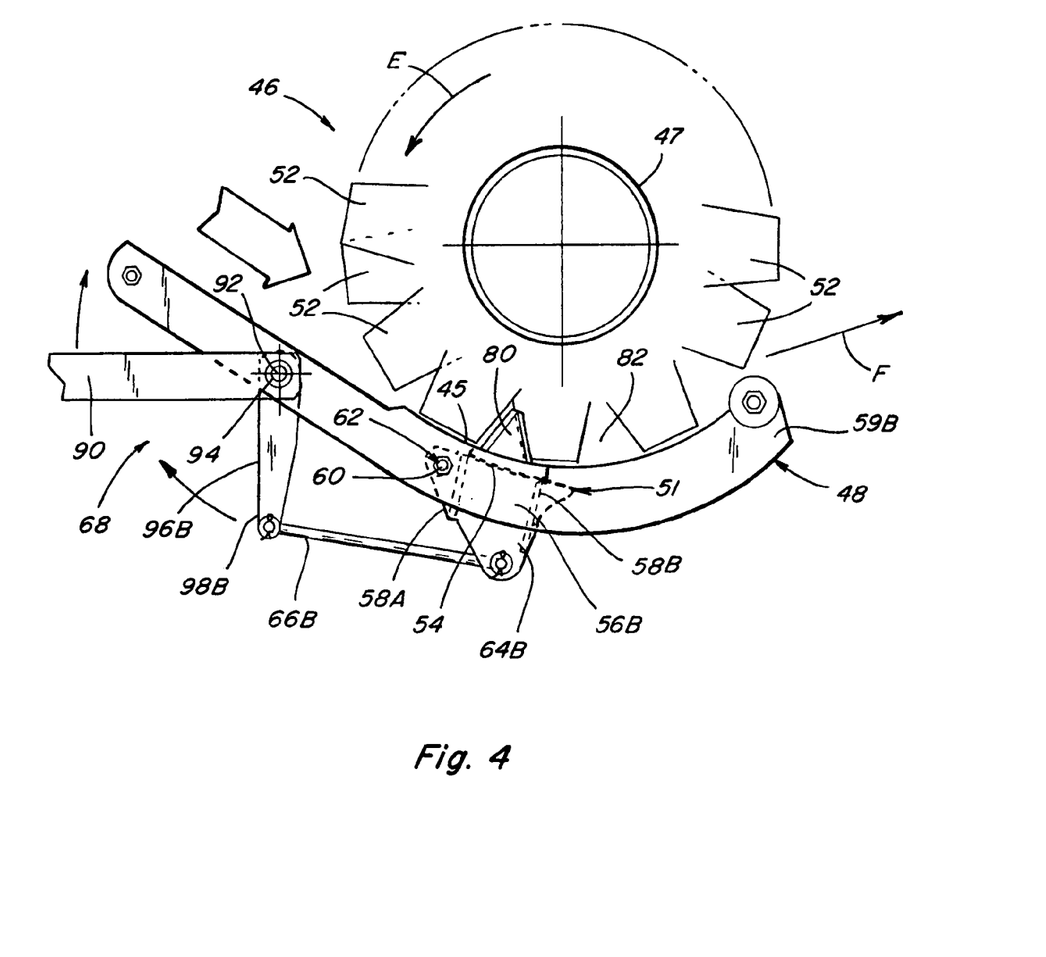
FIG. 4 is a simplified left side plan view of the chopper assembly portion of FIG. 3, illustrating the flow of crop residue therethrough.

FIGS. 3 and 4 depict generally a portion of a chopper assembly 46 that includes a rotary member 47 that extends generally horizontally across the flow path of the crop residue above a concave pan assembly 48 that, in this instance, includes, as part of the stationary knife assembly, a knife mounting assembly 51 (FIG. 4) therewith, as will be further explained hereinafter. The rotary member 47 includes a plurality of knife blades or elements 52 mounted thereon or attached thereto, shown in FIG. 3 in dotted outline only and in FIG. 4 in a somewhat representational form. The exact form and configuration of such mounted or attached knife blades or elements is not considered critical to the present invention.

Concave pan assembly 48 includes a floor portion 45 that has a plurality of spaced slots 49 therealong through which portions of aligned knife blades or elements 80 can be inserted to project into the flow passage 82 between rotary member 47 and concave pan assembly 48. A knife mounting assembly 51, as depicted in better detail in FIGS. 4-7, and including one or more counter knife banks or knife ranks according to the present invention, can be provided to include knife blades or elements 80 so formed into aligned columnar arrangements to readily engage and project through the spaced slots 49 of floor portion 45 of concave pan assembly 48, as depicted in FIG. 3.

With particular reference now to FIGS. 4-7, which depict a preferred embodiment of the present invention, the knife mounting assembly 51 includes a generally flat upper plate 54 positionable to extend generally horizontally across the flow path beneath floor portion 45 of the concave pan assembly 48, as illustrated in FIG. 4, end plates 56A and 56B at the opposite ends of the upper plate 54, and depending side wall portions 58A and 58B along the length of the upper plate 54 generally at or near the sides of the upper plate 54 and extending between the end plates 56A and 56B. As depicted in FIGS. 3-4, the end plates 56A and 56B are secured to side members 59A and 59B of concave pan assembly 48 at rotation points 60 (FIG. 4) by connection members, such as nut and bolt connectors 62, and have lower portions 64A and 64B connected via positioning rods 66A and 66B to a lever assembly 68, to define a rotational axis extending through rotation points 60, the purpose and operation of which will be further addressed hereinafter.

Figure 5:
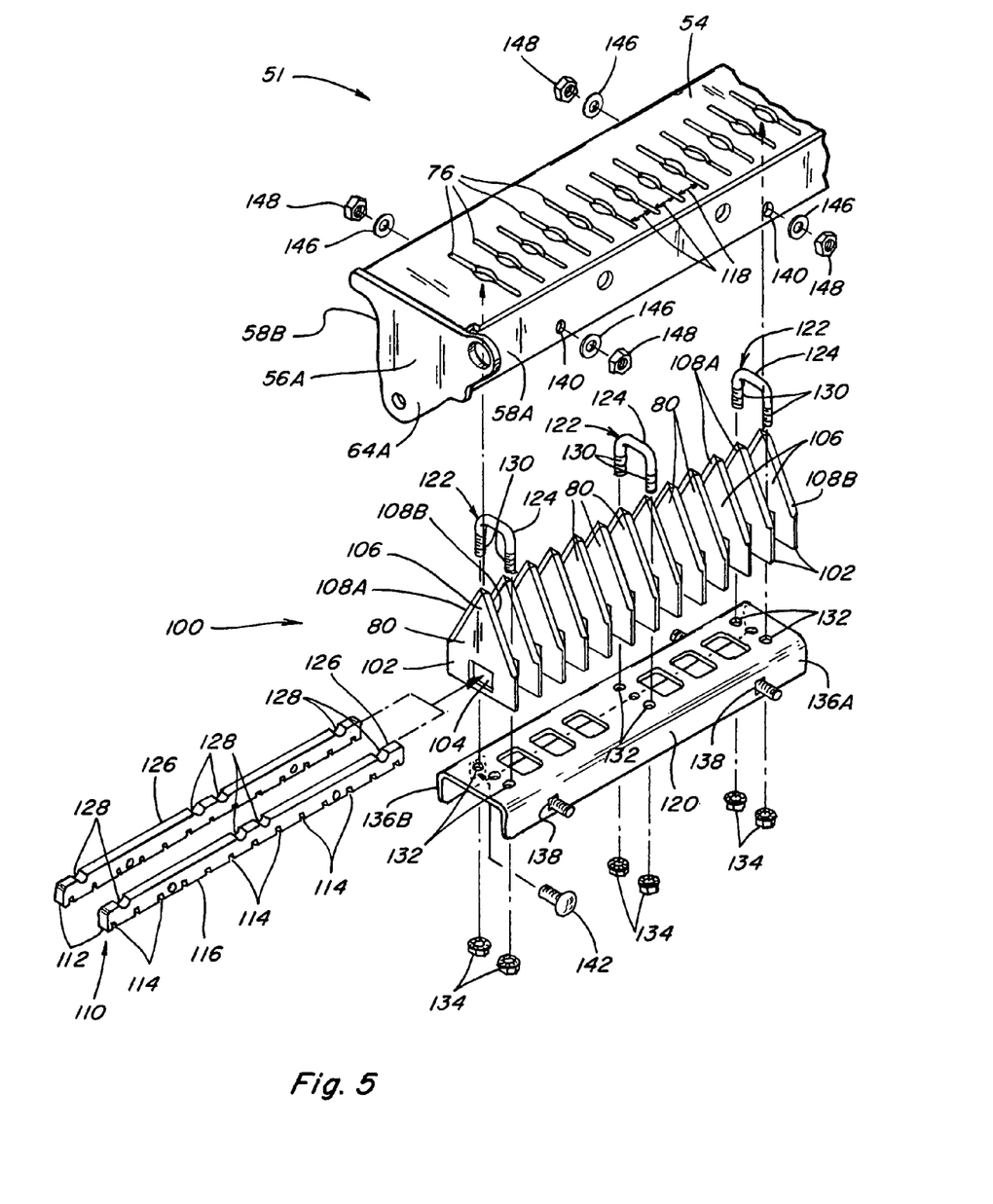
FIG. 5 is an exploded perspective view, taken from the right front, better showing component elements of the knife mounting assembly, including a counter knife bank or knife rank construction, and components thereof, according to the present invention.

As best shown in FIG. 5, the upper plate 54 includes spaced slots 76 extending laterally across the upper plate 54 between the sides thereof and along the length thereof, through which slots 76 upper portions of installed knife blades or elements 80 project. In FIGS. 3 and 4, the knife mounting assembly 51 is depicted in a normal, operational position, with knife blades or elements 80 extending through slots 76 in upper plate 54 and also through slots 49 in floor 45 of concave pan assembly 48 into the flow passage 82 between rotary member 47 and the concave pan assembly 48. As depicted in such FIGS. 3 and 4, the knife blades or elements 52 of the rotary member 47 and the knife blades or elements 80 of knife mounting assembly 51 are so designed and installed relative to one another that they do not, under normal circumstances and operation, interfere with one another, but, rather, complement one another in chopping the residue passing between the rotary member 47 and the concave pan assembly 48 in flow passage 82.

In some circumstances, however, such as to clear obstructions, users have found it desirable to be able to withdraw or retract the knife blades or elements 80 of the stationary knife assembly from the flow passage 82. In such events, lever assembly 68 may be operated to effect, through the coupled movement of positioning rods 66A and 66B, a rotation of knife mounting assembly 51 about the axis of rotation through rotation points 60 (FIG. 4), the consequence of which is the retraction of the knife blades or elements 80 from the flow passage 82. Lever assembly 68 includes an operable lever 90 coupled at rotational axis 92 (FIG. 3) to a rotatable connecting rod 94 extending between sides 59A and 59B of concave pan assembly 48, which connecting rod 94 is attached to support links 96A and 96B. Support links 96A and 96B are respectively connected to positioning rods 66A and 66B. When lever 90 is operated, connecting rod 94 is caused to rotate thereby effecting rotational movement of end portions 98A and 98B of support links 96A and 96B about rotational axis 92, consequent movement of positioning rods 66A and 66B, and a resulting rotational movement of the connected knife mounting assembly 51 about the axis of rotation through rotation points 60.

Figure 6:
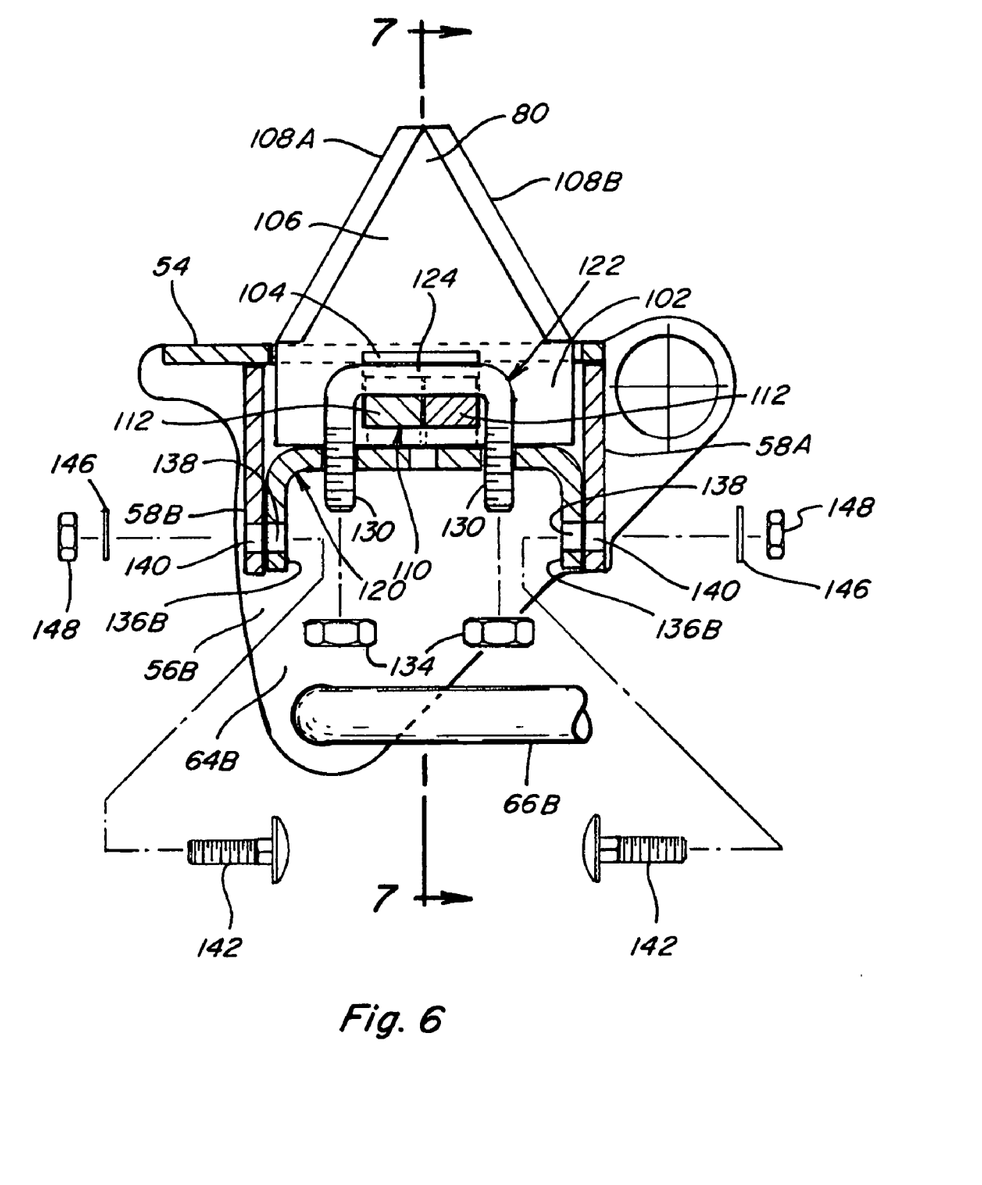
FIG. 6 is a cross-sectional view taken between the end plates of the knife mounting assembly of FIG. 3 looking from the right towards the end plate on the left side of the combine and depicting the stationary knife bank of FIG. 5 as installed with the knife mounting assembly.
Figure 7:
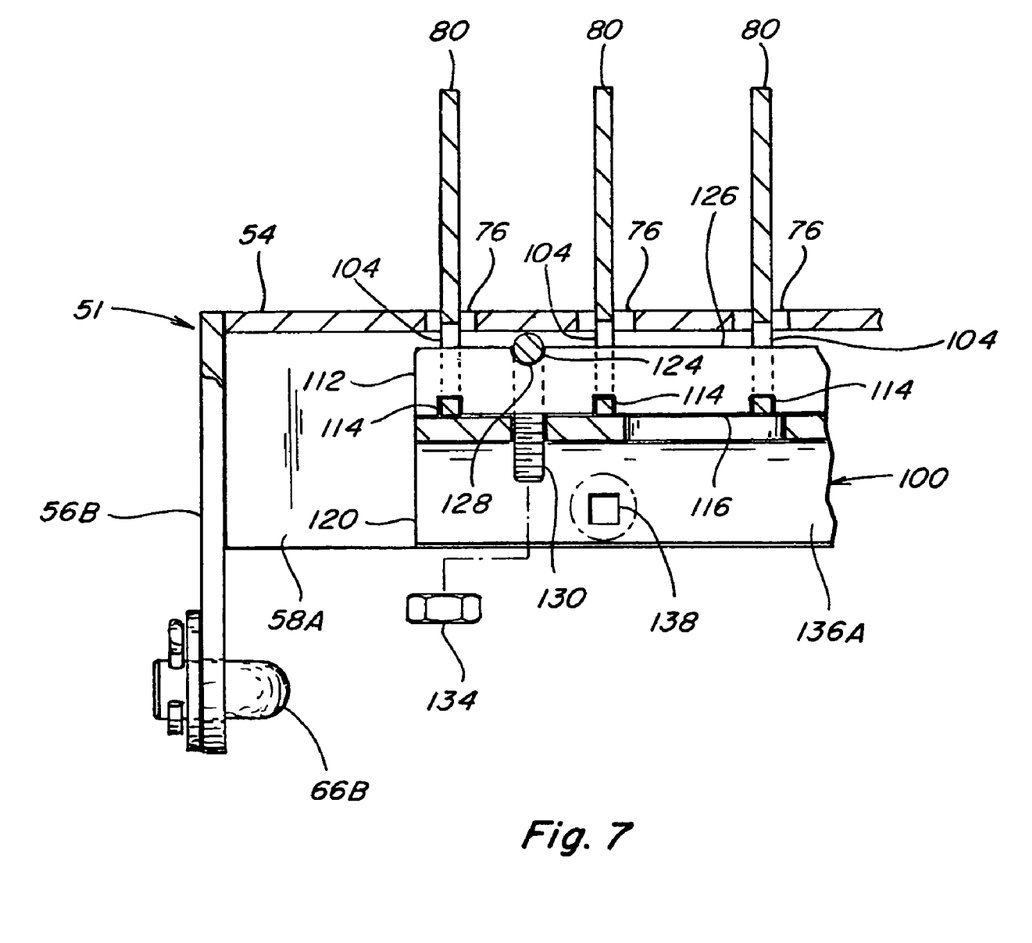
FIG. 7 is a cross-sectional view at cut-line 7-7 of FIG. 6, looking from the rear towards the front of the combine.

As will be appreciated, FIGS. 5-7 depict in greater detail further specifics of a preferred knife bank or knife rank construction 100 that can form a portion of the knife mounting assembly 51. Such knife bank or knife rank 100 includes a plurality of knife blades or elements 80 having base body portions 102 with apertures 104 therethrough and upper portions 106, shown here as having the form of an isosceles triangle, with cutting edges 108A and 108B. A spline connector 110 is provided and configured to extend through the aligned apertures 104 of a column of knife blades or elements 80 and to mate with such knife blades or elements so as to maintain the knife blades or elements in such column in an upright position at spaced intervals from one another.

The spline connector 110 may take various forms, but is depicted in FIG. 5 as comprising a pair of knife retainer members 112 that are of generally like design and configuration, sized and configured to be positionable side-by-side to one another within the apertures 104 in the base body portions 102 of the knife blades or elements 80. Such knife retainer members preferably include spaced lateral slits 114 along the bottom sides 116 thereof, which slits 114 are dimensioned to complementarily receive therein and to engage opposed side portions of the base body portions 102 of the knife blades or elements 80, adjacent to the apertures 104 therethrough, when the knife retainer members 112 are positioned extending through such apertures 104 and are moved into press-fit engagement with the knife blades or elements 80, with such engaged plurality of knife blades or elements and retainer members defining a knife formation. The slits 114 in the knife retainer members 112 are spaced to correspond to spacings 118 between slots 76 in the upper plate 54 of the knife mounting assembly 51, but there need not be a 1:1 correspondence between such slits 114 and slots 76, and knife blades or elements 80 need not be provided for every slot 76 in the upper plate 54 of the knife mounting assembly 51.

The knife retainer members 112 will preferably fit snugly within the apertures 104 of the base body portions 102 of the knife blades or elements 80 when positioned side-by-side, and the knife retainer members 112 may therefore optionally be slightly tapered along at least portions of one or both sides thereof to facilitate the press fitting of such knife retainer members 112 into position.

The preferred embodiment of the counter knife bank or knife rank 100 also includes a longitudinally extending support member 120 having an inverted U shape dimensioned to extend beneath and form a platform upon which the bases of the knife blades or elements 80 of the knife formation may rest and to which the knife formation is securely attached, such as by, in the preferred form of the invention shown, a plurality of U-bolt connectors 122 whose cross-pieces 124 extend laterally across the tops 126 of the retainer members 112, preferably within grooves 128 positioned along the tops 126 of the retainer members 112 to receive the cross-pieces 124 of the U-bolt connectors 122, and whose legs 130, which may be threaded, are attachable to the support member 120, such as through openings 132 in the support member 120 to underlying nuts 134 or other connection terminators.

The sides 136A and 136B of the support member 120 preferably include a plurality of spaced openings 138 therealong registrable with openings 140 along the extent of at least one of the side wall portions 58A and 58B of the knife mounting assembly 51, through which registered openings 138, 140 bolts 142 or other connector members may be inserted to attach and secure the support member 120 to the knife mounting assembly 51. Such openings are preferably dimensioned to accept carriage bolts positioned therein from the interior sides of the legs 136A and 136B of the inverted U-shaped support member 120 and to prevent the rotation of such carriage bolts when washers 146 and nuts 148 are inserted on the projecting threaded ends of such carriage bolts 142 and tightened.

The assembled counter knife bank or rank 100 can thus be easily installed as part of the knife mounting assembly 51 by positioning the knife blades or elements 80 of such assembled unit in registration with slots 76 in upper plate 54 of knife mounting assembly 51, by positioning openings 138 of the support member 120 in registration with openings 140 of side wall portions 58A and 58B, by inserting carriage bolts 142 through the respective aligned openings, and by tightening washers 146 and nuts 148 on the threaded ends of such carriage bolts to securely attach the assembled counter knife bank or knife rank 100 to knife mounting assembly 51.

When it is desired to reverse the cutting edges of the knife blades or elements 80, the assembled counter knife bank or knife rank 100 can be easily removed from the knife mounting assembly 51 by reversing the installation procedure, and the reversal of the cutting edges can be readily accomplished by reversing the orientation of the assembled counter knife bank or knife rank 100 relative to the knife mounting assembly 51 and re-installing such counter knife bank or knife rank 100 with such reversed orientation.

It should be understood and appreciated that the preferred form of counter knife bank or rank described herein is but one of many alternate forms and configurations that could be employed, and that many changes or modifications are possible without departing from the spirit and scope of the invention. For example, by way of further illustration, and not of limitation, with the same knife blades or elements 80, different types of spline connectors, including single as opposed to multiple member constructions, could be readily employed and could be attached to the support member in other fashions, such as by multiple threaded attachment members. For example, in one particular form, the spline connector could have connector openings therethrough and be connected to the support member by one or more threaded members extending through the connector openings, such as by three nut and bolt connector pairs, two of which could be positioned at opposite ends of the spline connector and one of which could be intermediately positioned along the length of the spline connector, generally approximately centrally along the spline connector.

In other configurations, the support member could have slits spaced along the length of the support member for receiving the base body portions of the knife blades or elements 80 and permitting positioning of the apertures in the base body portions below the top surface of the support member, and a spline connector could be installed through the apertures in such base body portions and beneath, rather than above, the top surface of the support member. Depending upon the particular sizes and dimensions of the various components, the inserted spline connector could itself, because of a tight fit design, obviate the need for use of U-bolts or threaded members or other attachment members to secure the spline connector to the support member and/or to maintain the knife blades or elements of the counter knife bank or knife rank in a spaced, upright column.

Figure 9:
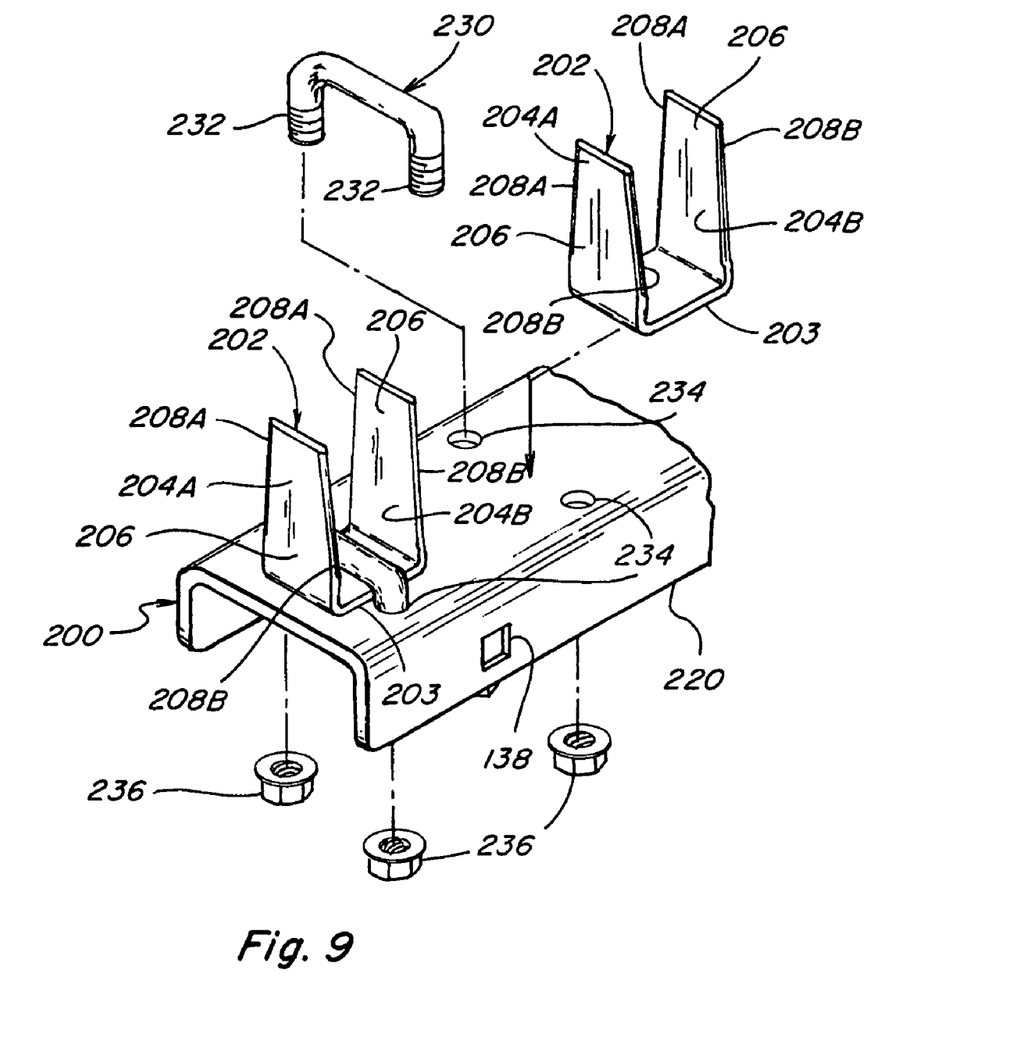
FIGS. 9-10 are perspective views of portions of alternative embodiments of a counter knife bank or knife rank according to the present invention which employ U-shaped knife blades or elements.
Figure 10:
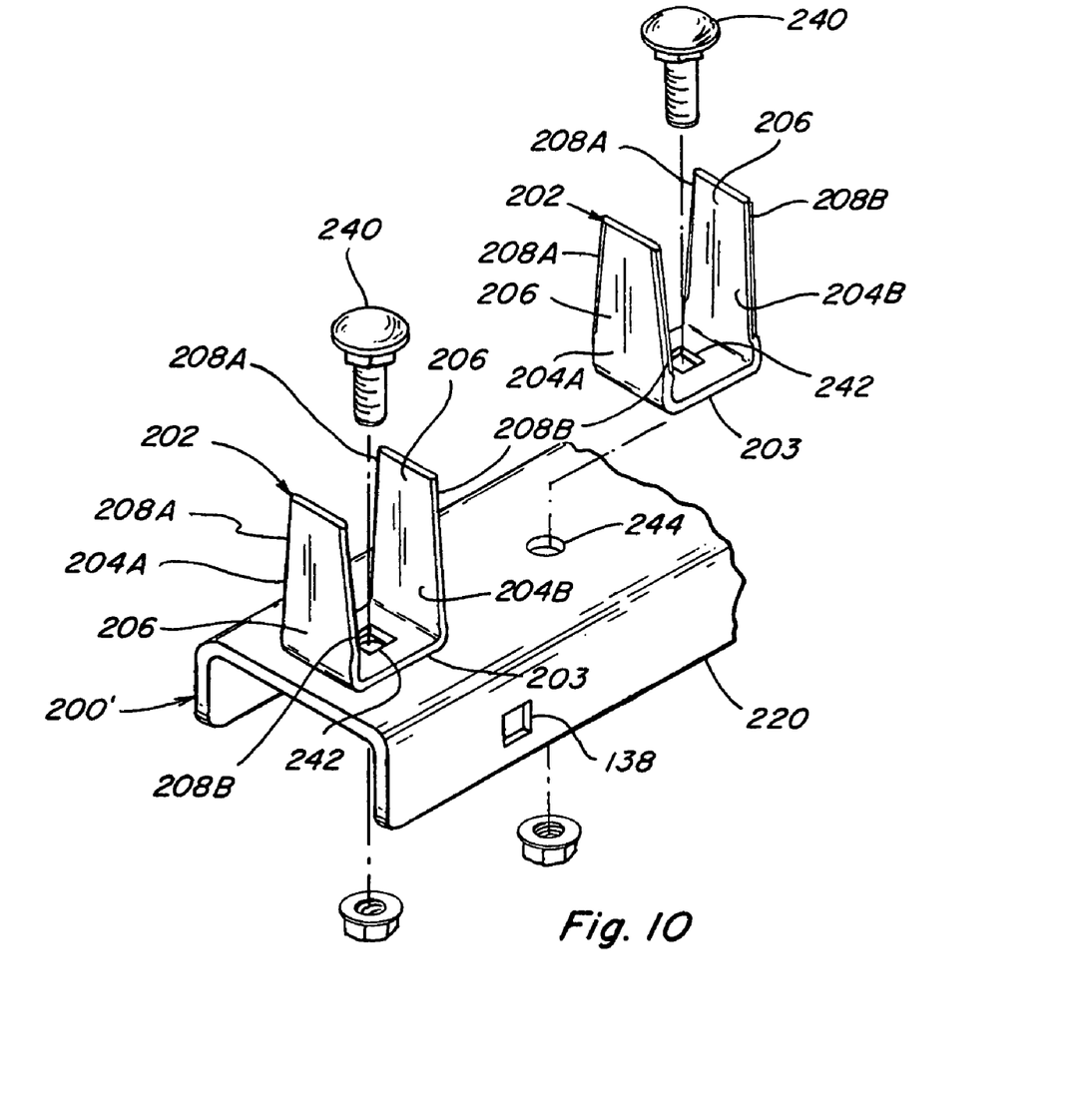

Modification or changes in the design of the knife blades or elements would permit and result in still further possible variations, all of which variations would still offer the various advantages sought. For example, FIGS. 9-10 depict portions of counter knife banks or knife ranks 200 and 200' according to the present invention that include U-shaped knife elements 202, with bases 203 and legs 204A and 204B. The legs 204A and 204B of the knife elements 202 are double-sided blade elements 206 with cutting edges 208A and 208B. The separate U-shaped knife elements 202 are directly attachable to an underlying longitudinally extending support member 220 which has an inverted U-shape dimensioned to extend beneath and form a platform upon which the bases 203 of knife elements 202 may rest. In FIG. 9, U-bolt connectors 230 extend laterally across the bases 203 of knife elements 202 and threaded legs 232 of such U-bolt connectors 230 are inserted through spaced connector holes 234 along the extent of the support member 220 and secured in place by tightening connector members such as nuts 236 on the ends of the threaded legs 232. In FIG. 10, the knife elements 202 are attachable to support member 220 by connector members such as carriage bolt connector constructions 240, which include carriage bolts and associated nuts, with the carriage bolts being insertable through aligned connector holes 242 in the bases 203 of elements 202 and the spaced connector holes 244 along the support member 220.

In general, any acceptable manner of attaching or securing the knife blades or elements in place along a longitudinal spacing connector assembly to effect a ranked arrangement of knife blades or elements may be utilized, provided the realized ranked arrangement is consistent with requirements of the present invention. In such regard, it should thus be recognized that numerous other attachment members or methods of well known designs could be conveniently employed for effecting the attachment of the knife elements 202 to the support member 220, including the use of singular or multiple connector members, such as nut and bolt connection assemblies, for each of the elements 202.

Similarly, while the blade elements 206 of FIGS. 9-10 are shown as being of a generally quadrilateral shape with opposed cutting edges 208A and 208B, the blade elements could, consistent with the present invention, equally as well have other configurations. In such regard, the blade elements could thus have configurations similar to the upper portions 106 of the knife blades or elements 80 of FIGS. 3-8 or a variety of other configurations, including configurations in which the individual blade portions along the length of the support member 22 vary, such as in an alternating pattern or according to a given scheme. Depending to some extent upon the design and characteristics of the knife blades or elements being utilized, the particular longitudinal spacing connector assembly employed in any given counter knife bank or knife rank construction, and the manner of associating the knife blades or elements of any given counter knife bank or knife rank construction with the longitudinal spacing connector assembly, may thus vary and take many alternate forms consistent with the present invention.

Figure 8:
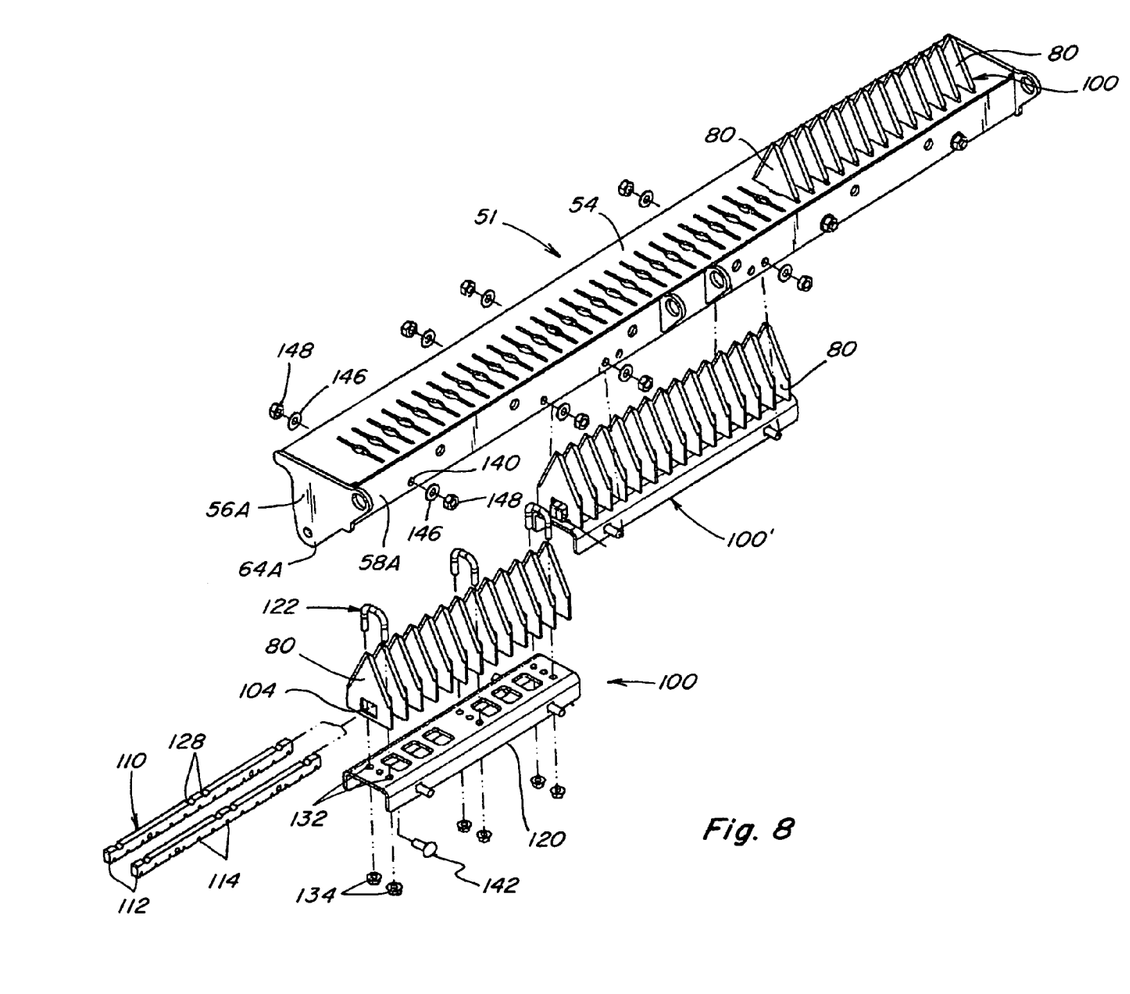
FIG. 8 is a perspective view of a knife mounting assembly into which or as part of which the counter knife bank or knife rank of FIG. 5 can be installed or employed.

As may be best appreciated from FIGS. 3, 5, and 8, depending upon the particular embodiments employed, one or more counter knife banks or knife ranks may be employed or required in order to span the entire length of the stationary knife assembly. If multiple knife banks or ranks are utilized, as shown in FIG. 8, such knife banks or knife ranks may be of the same or different lengths and configurations, and may include the same or differing numbers of knife blades or elements. For example, in the construction of FIG. 8, three counter knife bank or knife rank constructions are employed, two of which knife banks or knife ranks 100 are essentially identical and which include thirteen knife blades or elements 80. The third knife bank of knife rank 100' is highly similar to knife bank or knife rank 100, but includes fifteen knife blades or elements 80. While it might be advantageous in some instances and in some respects to utilize only a single, reversible knife bank, it has been found that in most instances and in most circumstances it may be preferable to use two or three, or even more, knife banks for ease of handling, especially in view of the bulk and weight of the assembled components and the confines within which a user must work and into which the knife banks must be installed. However, since it is not uncommon for stationary knife assemblies to employ forty-two, or even more, knife blades or elements, even when several knife banks or ranks are utilized the time and effort required for the reversal of the cutting edges of the knife blades or elements is still greatly reduced over what would be required for the individual reversal of the forty-two or more knife blades.

Additionally, although lever assembly 68 is shown herein as being a manually operable assembly, it should be recognized and understood that other types of assemblies could be equally as well utilized, including constructions that are remotely controllable and actuatable and which may employ various types of motors or other actuator or drive members to effect desired operation.

Although the counter knife bank or knife rank constructions described hereinabove have been discussed primarily in relationship to and use with a combine that includes an axially arranged threshing system and a rotary chopper assembly as part of the crop residue distribution system for such combine, it should be understood and appreciated that the use of such counter knife bank or knife rank constructions is not limited to such systems and/or chopper assemblies or the chopper assembly positions addressed hereinabove and that such counter knife bank or knife rank constructions can be employed with other systems and chopper assemblies and with chopper assemblies located or positioned differently from what has been addressed hereinabove, including in or with non-integrated chopper assemblies and hood mount chopper systems.

In light of all the foregoing, it should thus be apparent to those skilled in the art that there has been shown and described a counter knife bank or knife rank that can be readily employed to facilitate and simplify the reversal of the double-sided knife blades or elements in a chopper assembly, especially so that the time required for making such reversals is reduced while safety is improved. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A counter knife bank for a stationary knife assembly of a chopper assembly, the chopper assembly including a rotary member extending across a path of material flow through the chopper assembly and the stationary knife assembly including a knife mounting assembly positionable generally parallel to the rotary member to define a material flow passage therebetween and including a longitudinal, generally flat, upper plate with spaced slots extending laterally across the upper plate between the sides thereof and along the length of the plate, comprising a plurality of individual double-sided knife blades having cutting edges along their sides, a longitudinal spacing connector assembly joining and spacing said plurality of knife blades from one another in a columnar arrangement to form and define a ranked arrangement of said plurality of knife blades, the spacing between knife blades of said ranked arrangement corresponding to spacings between spaced slots of the upper plate of the knife mounting assembly, the cutting edges of said knife blades at one side of said ranked arrangement defining first cutting edges and the cutting edges of said knife blades at the other side of said ranked arrangement defining second cutting edges, said ranked arrangement attachable to and removable from the knife mounting assembly as a unit, said ranked arrangement attachable to the knife mounting assembly in a first orientation to expose said first cutting edges to active use and attachable to the knife mounting assembly in a second orientation to expose said second cutting edges to active use, wherein the knife mounting assembly includes end plates at the opposite ends of the upper plate and depending side wall portions generally at or near the sides of the upper plate and extending along at least a portion of the length of the upper plate between the end plates, and wherein said spacing connector assembly is attachable to at least one of the side wall portions of the knife mounting assembly, and wherein said knife blades each further include a base body portion having an aperture therethrough, wherein said apertures are aligned with one another in said ranked arrangement, and wherein said spacing connector assembly includes a spline connector that extends through the aligned apertures in the base body portions of the knife blades.

2. The counter knife bank of claim 1 wherein said spline connector and said plurality of knife blades are complementarily engageable with one another to define a knife formation, wherein said spacing connector assembly includes a support member, and wherein said knife formation and said support member are tightly engageable with one another to form said ranked arrangement of knife blades.

3. The counter knife bank of claim 2 wherein said knife formation is securable to said support member.

4. The counter knife bank of claim 2 wherein said spline connector includes a pair of generally like knife retainer members positionable side-by-side extending through the aligned apertures in the base body portions of the knife blades.

5. The counter knife bank of claim 4 wherein said knife retainer members include a plurality of spaced lateral slits across the bottom sides thereof, the spacings between said slits corresponding to spacings between slots in the knife mounting assembly, said slits dimensioned to complementarily engage the portions of said base body portions of said knife blades below said apertures in said base body portions in a press fit engagement and to spacedly maintain said knife blades from one another in generally upright positions.

6. The counter knife bank of claim 2 wherein said spacing connector assembly includes connection members securing said knife formation to said support member.

7. The counter knife bank of claim 6 wherein said support member includes spaced connector openings along the length thereof on opposite sides of the spline connector and wherein said connection members include U bolt connectors the cross pieces of which extend across the tops of the spline connector and the legs of which extend through said connector openings.

8. The counter knife bank of claim 7 wherein said spline connector includes spaced grooves across the top side thereof for complementarily receiving said cross-pieces of said U-bolt connectors.

9. The counter knife bank of claim 2 wherein said support member is attachable to the knife mounting assembly when said ranked arrangement of said plurality of knife blades is in said first orientation to expose said first cutting edges to active use and is also attachable to the knife mounting assembly when said ranked arrangement of said plurality of knife blades is in said second orientation to expose said second cutting edges to active use.

10. The counter knife bank of claim 2 wherein the knife mounting assembly includes first and second side wall portions depending from the upper plate of the knife mounting assembly and wherein said support member includes side wall portions, one of said side wall portions of said support member attachable to a given side of the knife mounting assembly when said ranked arrangement of said plurality of knife blades is in said first orientation to expose said first cutting edges to active use and the other of said side walls of said support member attachable to the given side of the knife mounting assembly when said ranked arrangement of said plurality of knife blades is in said second orientation to expose said second cutting edges to active use.

11. The counter knife bank of claim 10 wherein said support member has a generally inverted U-shaped cross section.

12. The counter knife bank of claim 1 wherein said spacing connector assembly includes a support member and wherein said individual double-sided knife blades are securely mounted to said support member.

13. The counter knife bank of claim 12 including a plurality of U-shaped knife elements having leg portions and a base portion extending between said leg portions, each of said leg portions being a blade portion, said blade portions forming said plurality of individual double-side knife blades, said knife elements being securely mountable along said support member.

14. The counter knife bank of claim 13 wherein said blade portions are of a quadrilateral shape.

15. The counter knife bank of claim 13 including connector members connecting said knife elements to said support member.

16. The counter knife bank of claim 15 wherein said connector members include U-bolts having threaded legs with cross-pieces extending between said threaded legs and nuts threadedly connectable upon said threaded legs, wherein said support member includes pairs of laterally aligned openings spaced along the support member and sized to receive said threaded legs of said U-bolts therethrough, wherein said base portions of said knife elements are sized and dimensioned to fit between said pairs of laterally aligned openings, wherein said U-bolts are each associated with a respective knife element and a respective pair of laterally aligned openings in said support member, and wherein said cross-pieces of said U-bolts extend across the base portions of the respective associated knife elements to secure said knife elements along the support member when said threaded legs of said U-bolts are inserted through the respective pairs of laterally aligned openings along said support member and said nuts are tightened on said threaded legs.

17. The counter knife bank of claim 15 wherein said connector members include carriage bolt constructions including carriage bolts and a nuts therefor, wherein said support member includes spaced openings therealong sized to receive said carriage bolts inserted therein, wherein said bases of said knife elements have openings therethrough likewise sized to receive said carriage bolts when said knife elements are positioned along said support member with said openings in said base portions of said knife elements in registration with said openings in said support member, and wherein said carriage bolts extend through said registered openings and said nuts are tightened thereon.

18. The counter knife bank of claim 12 wherein the knife mounting assembly includes end plates at the opposite ends of the upper plate and depending side wall portions generally at or near the sides of the upper plate and extending along at least a portion of the length of the upper plate between the end plates, and wherein said support member is attachable to at least one of the side wall portions of the knife mounting assembly.

19. The counter knife assembly of claim 18 wherein said support member is attachable to the knife mounting assembly when said ranked arrangement of said plurality of knife blades is in said first orientation to expose said first cutting edges to active use and is also attachable to the knife mounting assembly when said ranked arrangement of said plurality of knife blades is in said second orientation to expose said second cutting edges to active use.

20. The counter knife bank of claim 18 wherein the knife mounting assembly includes first and second side wall portions depending from the upper plate of the knife mounting assembly and wherein said support member includes side wall portions, one of said side wall portions of said support member attachable to a given side of the knife mounting assembly when said ranked arrangement of said plurality of knife blades is in said first orientation to expose said first cutting edges to active use and the other of said side walls of said support member attachable to the given side of the knife mounting assembly when said ranked arrangement of said plurality of knife blades is in said second orientation to expose said second cutting edges to active use.

21. A stationary knife assembly for a chopper assembly of an agricultural combine, the chopper assembly including a rotary member extending crossways to the path of crop residue flow through the chopper assembly and a concave pan assembly spaced below the rotary member and extending generally parallel to the rotary member to define a crop residue flow passage between the rotary member and the concave pan assembly, the concave pan assembly including side members at the sides of the crop residue flow passage and a floor portion extending lengthwise between such side members of the concave pan assembly, the floor portion including spaced lateral slots along the length of the floor portion sized and dimensioned to receive therethrough projecting portions of knife blade elements, comprising a knife mounting assembly disposed generally parallel to the rotary member to define a crop flow passage therebetween and including a longitudinal, generally flat, upper plate with spaced slots extending laterally across said upper plate between the sides thereof and along the length of said upper plate, and a counter knife bank assembly matable with said knife mounting assembly, said counter knife bank assembly including a plurality of individual double-sided knife blades having cutting edges along their sides, a longitudinal spacing connector assembly joining and spacing said plurality of knife blades from one another in a columnar arrangement to form and define a ranked arrangement of said plurality of knife blades, the spacing between knife blades of said ranked arrangement corresponding both to spacings between said spaced slots of said upper plate of said knife mounting assembly and spacings between spaced slots of the floor portion of the concave pan assembly, the cutting edges of said knife blades at one side of said ranked arrangement defining first cutting edges and the cutting edges of said knife blades at the other side of said ranked arrangement defining second cutting edges, said ranked arrangement attachable to and removable from said knife mounting assembly as a unit, said ranked arrangement attachable to said knife mounting assembly in a first orientation to expose said first cutting edges to active use and attachable to the knife mounting assembly in a second orientation to expose said second cutting edges to active use, said end walls of said knife mounting assembly being connected to the side members of the concave pan assembly and said knife mounting assembly being positionable relative to the floor portion of the concave pan assembly such that the knife blades of said counter knife bank project through spaced lateral slots of the floor portion of the concave pan assembly, wherein the spacing connector assembly includes a support member and where the individual double-sided knife blades are securely mounted to the support member, and further wherein the counter knife bank includes a plurality of U-shaped knife elements having leg portions and a base portion extending between said lea portions, each of said lea portions being a blade portion, said blade portions forming said plurality of individual double-side knife blades, said knife elements being securely mountable along said support member.

22. The stationary knife assembly of claim 21 wherein the points of connection of said knife mounting assembly to the side members of the concave pan assembly define an axis of rotation for said knife mounting assembly, said knife mounting assembly being rotatable about said axis of rotation to withdraw said knife blades from the spaced lateral slots of the floor portion of the concave pan assembly.

23. The stationary knife assembly of claim 22 including a rod member extending through said end walls of said knife mounting assembly and the side members of the concave pan assembly and connecting said end walls of said knife mounting assembly to the side members of the concave pan assembly.

24. The stationary knife assembly of claim 22 including a control mechanism for controlling the rotation of said knife mounting assembly about said axis of rotation.

25. The stationary knife assembly of claim 24 wherein said control mechanism includes a lever assembly operable to effect rotation of said knife mounting assembly about said axis of rotation.

26. A method for reversibly utilizing double-sided knife blades in a stationary knife assembly of a chopper assembly, the chopper assembly including a rotary member extending across a path of material flow through the chopper assembly and the stationary knife assembly including a knife mounting assembly disposed generally parallel to the rotary member to define a material flow passage therebetween and including a longitudinal, generally flat, upper plate with spaced slots extending laterally across the upper plate between the sides thereof and along the length of the plate, comprising providing a counter knife bank, said counter knife bank including a plurality of individual double-sided knife blades having cutting edges along their sides, a longitudinal spacing connector assembly joining and spacing said plurality of knife blades from one another in a columnar arrangement to form and define a ranked arrangement of said plurality of knife blades, the spacing between knife blades of said ranked arrangement corresponding to spacings between the spaced slots of the upper plate of the knife mounting assembly, the cutting edges of said knife blades at one side of said ranked arrangement defining first cutting edges and the cutting edges of said knife blades at the other side of said ranked arrangement defining second cutting edges, said ranked arrangement attachable to and removable from the knife mounting assembly as a unit, said ranked arrangement attachable to the knife mounting assembly in a first orientation to expose said first cutting edges to active use and attachable to the knife mounting assembly in a second orientation to expose said second cutting edges to active use, attaching said counter knife bank as a unit to the knife mounting assembly with the ranked arrangement in a first orientation to expose said first cutting edges to active use, removing said counter knife bank as a unit from the knife mounting assembly, wherein the knife blades each include a base body portion having an aperture therethrough, wherein said apertures are aligned with one another in said ranked arrangement, and wherein said spacing connector assembly includes a spline connector that extends through the aligned apertures in the base body portions of the knife blades, reversing the orientation of said knife bank relative to the knife mounting assembly, and attaching said counter knife bank as a unit to the knife mounting assembly with the ranked arrangement in the second orientation to expose said second cutting edges to active use.

27. The method of claim 26 wherein the knife mounting assembly includes end plates at the opposite ends of the upper plate and depending side wall portions generally at or near the sides of the upper plate and extending along at least a portion of the length of the upper plate between the end plates, and wherein said spacing connector assembly is attachable to at least one of the side wall portions of the knife mounting assembly.

* * * * *